(12) United States Patent
Lee (10) Patent No.: US 11,270,244 B2
(45) Date of Patent: Mar. 8, 2022

(54) MONITORING DEVICE AND SYSTEM

(71) Applicant: Luxon Data Holdings Pte. Ltd., Singapore (SG)

(72) Inventor: Hui Ling Lee, Quarry Bay (HK)

(73) Assignee: Luxon Data Holdings Pte. Ltd., Singapore (SG)

( * ) Notice: Subject to any disclaimer, the term of this patent is extended or adjusted under 35 U.S.C. 154(b) by 219 days.

(21) Appl. No.: 16/451,961

(22) Filed: Jun. 25, 2019

(65) Prior Publication Data
US 2019/0392384 A1   Dec. 26, 2019

(30) Foreign Application Priority Data

Jun. 26, 2018 (SG) .......................... 10201805510Y (51) Int. Cl.
| | |
|---|---|
| *H04W 4/35* | (2018.01) |
| *H04W 4/80* | (2018.01) |
| *G06Q 10/08* | (2012.01) |
| *G06Q 50/28* | (2012.01) |
| *H04W 4/38* | (2018.01) |
| *G01D 21/02* | (2006.01) |

(52) U.S. Cl.
CPC ..... *G06Q 10/0832* (2013.01); *G06Q 10/0833* (2013.01); *H04W 4/35* (2018.02); *H04W 4/80* (2018.02)

(58) Field of Classification Search
CPC .................................................. G06Q 10/0832
See application file for complete search history.

(56) References Cited

U.S. PATENT DOCUMENTS

| | | | |
|---|---|---|---|
| 10,126,047 | B2 | 11/2018 | Watanabe et al. |
| 2009/0109033 | A1 | 4/2009 | Salvat |
| 2015/0294210 | A1* | 10/2015 | Martinez de Velasco Cortina ..... G06K 19/0723 235/492 |

(Continued)

FOREIGN PATENT DOCUMENTS

| | | |
|---|---|---|
| CN | 107478269 | 12/2017 |
| CN | 208620698 | 3/2019 |
| CN | 208751126 | 4/2019 |

*Primary Examiner* — Joseph H Feild
*Assistant Examiner* — Pameshanand Mahase
(74) *Attorney, Agent, or Firm* — Warner Norcross + Judd LLP (57) ABSTRACT

The present invention relates to a monitoring device and system, the monitoring device comprises a sensing module arranged to detect a condition of an object associated with the monitoring device; a wireless communication module operably connected with the sensing module, the communication module being arranged to communicate the condition detected by the sensing module to an external electronic device; and an identification module with a unique identifier arranged to be read for identifying the monitoring device. During transportation and storage of object, it is desirable to monitor some physical properties continuously, detect anti-counterfeiting and track the location of the object. By utility a smart monitoring device described in the present invention as an add-on to the old boxes in cold-chain logistic, the present invention allows users to obtain such data in real time, and further transmits the data to external devices for warning and analysis, thus improving the reliability and efficiency in a supply chain.

20 Claims, 4 Drawing Sheets

(56) References Cited

U.S. PATENT DOCUMENTS

| | | | |
|---|---|---|---|
| 2015/0300887 A1* | 10/2015 | Mandava | G01K 1/026 |
| | | | 702/130 |
| 2016/0217309 A1 | 7/2016 | Clement et al. | |
| 2017/0004445 A1* | 1/2017 | Lazier | G06Q 10/0835 |
| 2017/0053290 A1 | 2/2017 | Atkinson et al. | |
| 2017/0185957 A1* | 6/2017 | Kilmer | H04L 9/14 |
| 2018/0144429 A1* | 5/2018 | Kim | G06Q 10/06393 |
| 2019/0102735 A1* | 4/2019 | Barton | G06Q 10/0833 |

\* cited by examiner

MONITORING DEVICE AND SYSTEM

FIELD OF INVENTION

This invention relates to a monitoring device and a monitoring system. More particularly, although not exclusively, the invention relates to a smart device and system for monitoring physical properties of an object in a supply chain.

BACKGROUND OF INVENTION

Nowadays in industries such as logistic, pharmaceutical and fresh produce industries, existing cold boxes are no longer desired due to their inability to measure and keep track of essential physical properties of the boxes such as temperature, humidity, light, etc., which can adversely affect quality and safety of the food and drugs, and may not comply with local regulations to ensure public health.

Many devices are developed to measure these physical properties. One conventional way is to place a temperature or humidity recording device to obtain the data. Technologies nowadays allow users to read a digital value of the measurement from the devices directly, or optionally the device may have a memory chip to store the data, and the user can then retrieve the data through a USB connection. However, the data obtained this way is delayed and the integration is inflexible when more than one physical property is to be measured.

SUMMARY OF INVENTION

In the light of the foregoing background, it is an object to address the above needs, to overcome or substantially ameliorate the above disadvantages or, more generally, to provide a monitoring device and system to monitor an object in real time during transportation and storage.

The above object is met by the combination of features of the main claims; the dependent claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect is a monitoring device, comprising a sensing module arranged to detect a condition of an object associated with the monitoring device; a wireless communication module operably connected with the sensing module, the communication module being arranged to communicate the condition detected by the sensing module to an external electronic device; and an identification module with a unique identifier arranged to be read for identifying the monitoring device.

Preferably, the sensing module includes a temperature sensor arranged to detect temperature of the object or of an environment in which the object is arranged.

More preferably, the sensing module further includes a humidity sensor arranged to detect humidity of the object or of an environment in which the object is arranged.

Most preferably, the sensing module further includes a motion sensor arranged to detect a motion of the object.

Preferably, the motion sensor includes an accelerometer, an inertial measurement unit, or a gyro sensor.

According to a variation of the preferred embodiments, the monitoring device comprises a temperature sensor, a humidity sensor and a motion sensor, wherein the temperature sensor, the humidity sensor, and the motion sensor are arranged to simultaneously operate to detect respective conditions of the object.

Additionally, the monitoring device is arranged to operate in an active mode, a reduced operation mode, and a hibernation mode; wherein in the active mode, the sensing module continuously detects the condition of the object and the wireless communication module continuously transmits the detected condition to the external electronic device; wherein in the reduced operation mode, the sensing module intermittently detects the condition of the object and the wireless communication module intermittently transmits the detected condition to the external electronic device; and wherein in the hibernation mode, the sensing module intermittently detects the condition of the object and the wireless communication module is deactivated.

Preferably, the wireless communication module comprises one or more of: a Bluetooth communication module, a Wi-Fi communication module, and a cellular communication module.

More preferably, the cellular communication module comprises an LTE communication module.

Preferably, the identification module comprises an NFC module, wherein the NFC module includes a RFID tag.

More preferably, the RFID tag is a dual-band RFID tag operable in a first frequency band and a second frequency band, wherein the first frequency band is a high-frequency radio band for identification, and the second frequency band is a ultra-high-frequency radio band for locating the monitoring device.

Additionally, the monitoring device further comprises a power source arranged to power the monitoring device, wherein the power source comprises at least one replaceable battery cell.

Preferably, the monitoring device is arranged to selectively operate in the active mode, the reduced operation mode, and the hibernation mode based on an energy level of the power source.

In addition, the monitoring device further comprises a display arranged to display the condition detected by the sensing module. The display may be a LED/OLED display.

Furthermore, the monitoring device comprises a clock arranged to determine a time stamp associated with the detected condition.

Additionally, the monitoring device further comprises an alarm arranged to warn a user when the condition exceeds or below a predetermined range.

In one specific implementation, the object is a container arranged to provide a cold environment, and wherein the monitoring device is suitable for attaching to the container.

In another aspect, the present invention is a monitoring system, comprising: a monitoring device of the first aspect; and an external electronic device arranged to communicate with the monitoring device for receiving one or more of: a condition detected by a sensing module and an unique identifier of the monitoring device.

Preferably, the external electronic device is further arranged to analyze the condition detected by the sensing module to provide an analysis result.

More preferably, the external electronic device further comprises a display arranged to display the condition detected by the sensing module, and/or a server arranged to store the detected condition.

Other aspects of the invention will become apparent by consideration of the detailed description and accompanying drawings.

During transportation and storage of object, it is desirable to monitor some physical properties continuously, detect anti-counterfeiting and track the location of the object. By utility a smart monitoring device as an add-on to the old boxes, the present invention allows users to obtain such data in real time, and further transmits the data to external devices for warning and analysis, thus improving the reliability and efficiency in a supply chain.

The monitoring device according to the present invention is suitable to be attached to any existing object (e.g. container, bag, box, etc.) for monitoring and tracking. For example, by attaching or placing the monitoring device of the present invention in existing cold boxes, they become "smart boxes", or in the case of exiting refrigerated trucks, the trucks become "smart refrigerators". In this way, the need to replace the entire existing container can be eliminated, which saves cost and achieves in great flexibility.

BRIEF DESCRIPTION OF FIGURES

The foregoing and further features of the present invention will now be described, by way of example, with reference to the accompanying drawings in which.

DETAILED DESCRIPTION OF THE PREFERRED EMBODIMENTS

Figure 1:
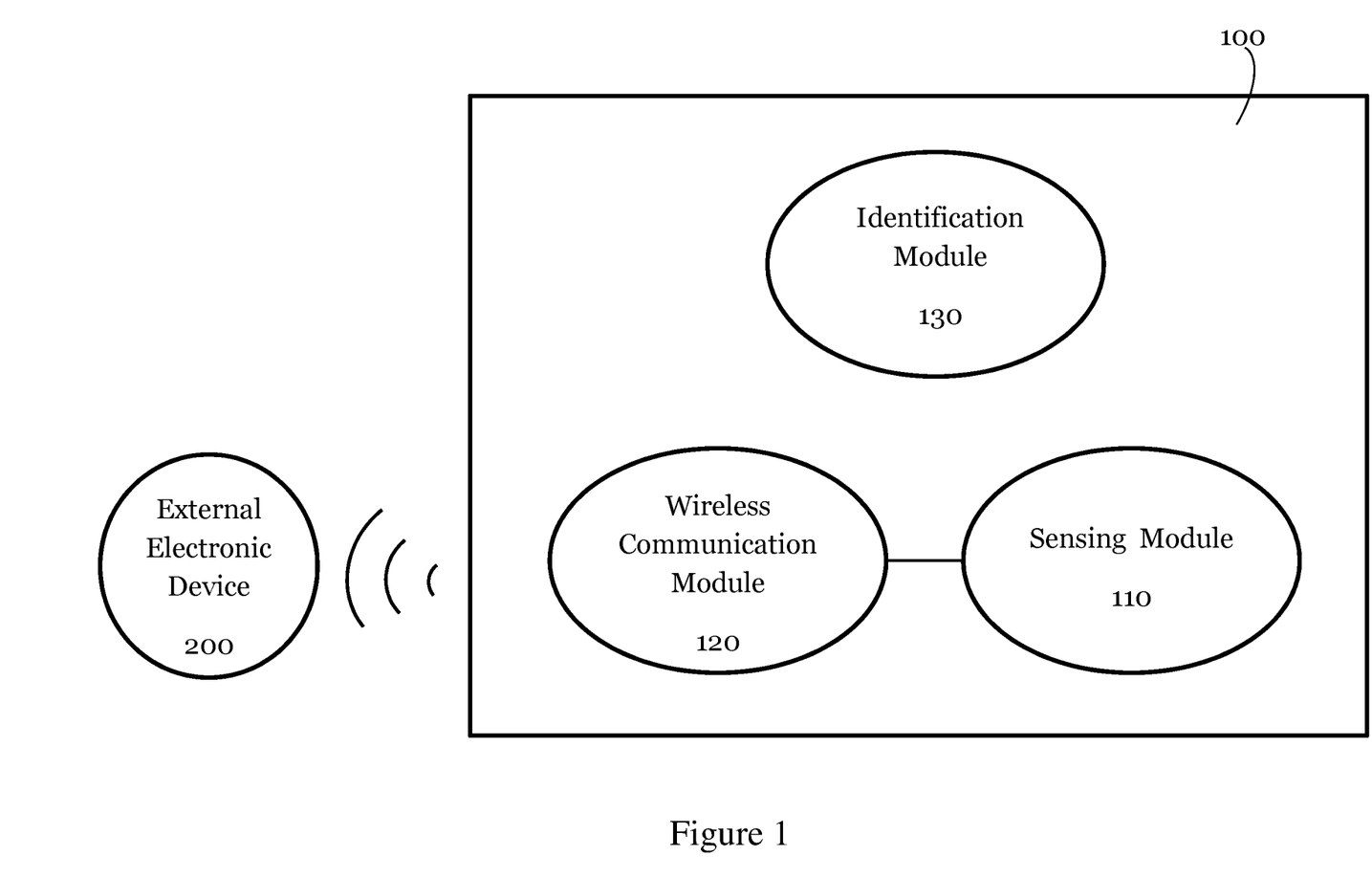
FIG. 1 shows a functional block diagram of a monitoring device according to one embodiment of the invention.

FIG. 1 shows a functional block diagram of a monitoring device 100 according to one embodiment of the invention. The monitoring device 100 comprises a sensing module 110 arranged to detect a condition of an object (not shown) associated with the monitoring device 100. Preferably, the object (not shown) is related to a cold-chain platform such as a cold box. Alternatively, the object may be a refrigerated van. The monitoring device 100 may be placed on, within or attached to the object (not shown) for sensing and monitoring. The monitoring device 100 also comprises a wireless communication module 120 operably connected with the sensing module 110, the wireless communication module 120 arranged to communicate the condition detected by the sensing module 110 to an external electronic device 200. Examples of the external electronic device 200 may include a smartphone, a computer, a laptop or a personal digital assistant (PDA), which are equipped with respective wireless communication modules to communicate with the monitoring device 100. The monitoring device 100 further comprises an identification module 130 with a unique identifier arranged to be read for identifying and locating the monitoring device 100.

Figure 2:
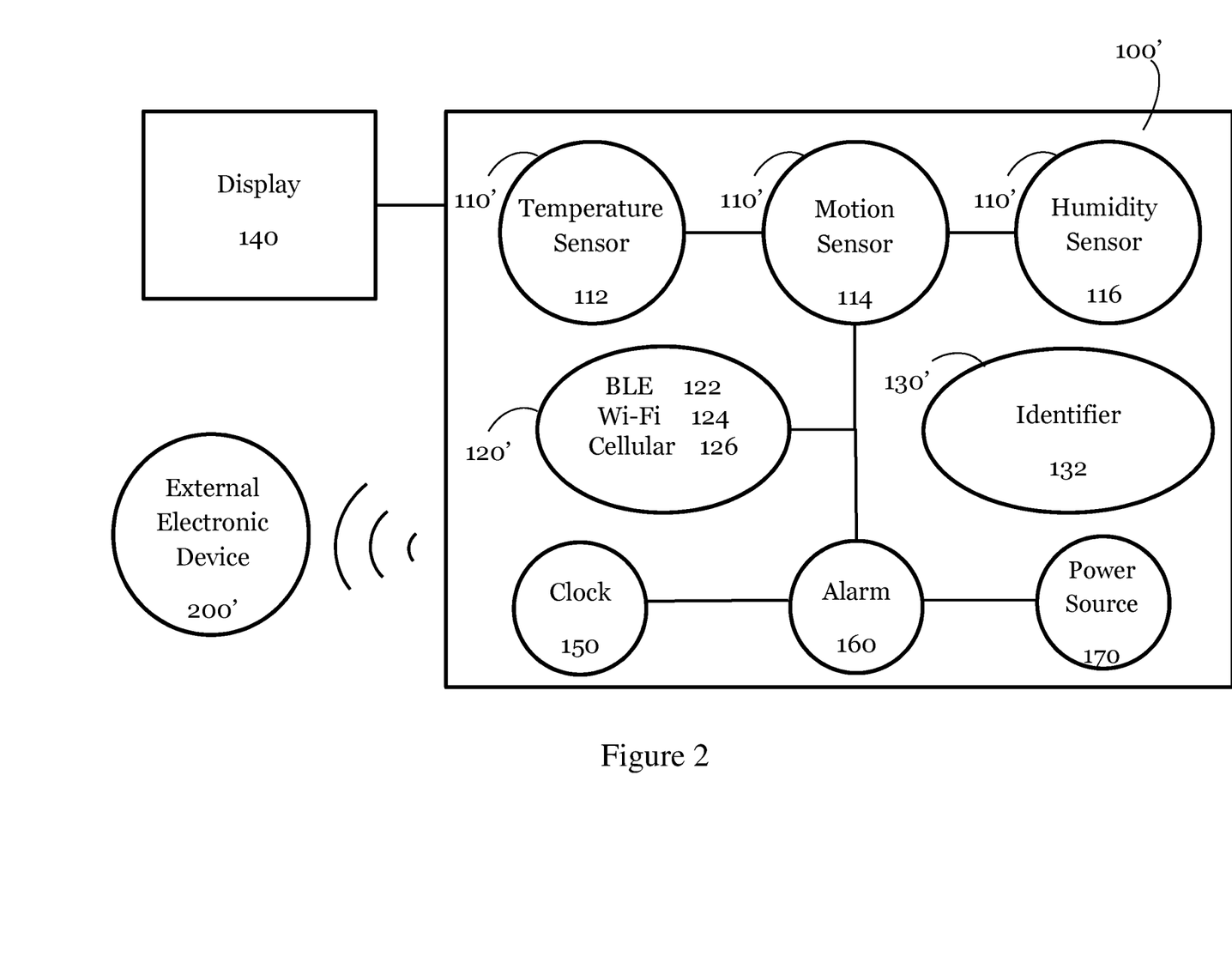
FIG. 2 shows a functional block diagram of a monitoring device according to another embodiment of the invention.

Referring to FIG. 2, it shows a functional block diagram of the monitoring device 100' of a specific implementation of the present invention. The monitoring device 100' in FIG. 2 is similar to the monitoring device 100 in FIG. 1 (like components are labelled using like references). In FIG. 2, the sensing module 110'of the monitoring device 100' comprises a temperature sensor 112, a humidity sensor 116 and a motion sensor 114, These sensors are preferably to be placed on, within or attached to the object (not shown) to be monitored, where the temperature sensor 112 and the humidity sensor 116 are arranged to detect respectively the temperature and the humidity of the object (not shown) or of the environment in which the object is arranged, and where the motion sensor 114 may be an accelerometer, an inertial measurement unit, or a gyro sensor to measure and monitor for example a tilt angle, a pitch angle, an acceleration or a deceleration. In one example, the motion sensor is essential in which the object is a pharmaceutical product where any slight tilting is not desired or permitted. Preferably, the multiple sensors (i.e. the temperature sensor, the humidity sensor and the motion sensor in this embodiment) are arranged to simultaneously operate to detect respective conditions of the object (not shown), and the monitoring device 100' preferably comprises a clock 150 or a timer (not shown) for determining a time stamp associated with the sensed data.

The monitoring device 100' includes a power source 170 arranged to power the monitoring device 100'. In this example, the power source 170 is a plurality of replaceable battery cells. Preferably, the battery cells are rechargeable. The monitoring device 100' may selectively operate in different operation modes based on the energy level of the power source 170. In this embodiment, the operation modes of the monitoring device 100' include an active mode, a reduced operation mode, and a hibernation mode. In the active mode, the sensing module 110' continuously detects the condition of the object (not shown) and the wireless communication module 120' continuously transmits the detected condition to the external electronic device 200', for example every 0.1, 1 or 5 seconds. In the reduced operation mode, the sensing module 110' continuously detects the condition of the object (not shown), for example every 0.1, 1 or 5 seconds, and the wireless communication module 120' intermittently transmits the detected condition to the external electronic device 200', for example every 0.5, 1 or 5 minute. In the hibernation mode, the sensing module 110' intermittently detects the condition of the object (not shown), for example every 0.5, 1 or 5 minute, and the wireless communication module 120' is deactivated such that no data is transmitted to the external electronic device 200'.

The identification module 130' of the monitoring device comprises a near-field communication (NFC) module, comprising a unique identifier 132 and preferably a radio-frequency identification (RFID) tag (not shown). In this embodiment, the RFID tag is a passive dual-band RFID tag operable in a first frequency band and a second frequency band. The first frequency band is within the bandwidth of high-frequency radio band, e.g. ~13 MGHz, and the second frequency band is within the bandwidth of ultra-high-frequency radio band, e.g. 850-930 MGHz. In one example, the ultra-high-frequency band of the RFID tag can be used for locating and tracking the presence of the monitoring device 100' by using a corresponding external reader (not shown). The ultra high frequency allows such locating and tracking to be done at a distance from the monitoring device 100' so that stocktaking can be done easily for multiple items with multiple such monitoring devices at the same time. The high-frequency band of the RFID tag can be used for identifying anti-counterfeiting of the monitoring device 100' and thus the object which the monitoring device is attached to, by using the same or another corresponding external reader (not shown) e.g. a smartphone.

The wireless communication module 120' of the monitoring device 100' comprises a Bluetooth communication module 122, a Wi-Fi communication module 124 and a cellular communication module 126, such as a LTE communication module, to communicate with the external electronic device 200'. All the data detected by the sensing module 110' can be transmitted to the external electronic device 200' through any one of the communication modules to achieve real-time monitoring. The external device 200' may include a smartphone, a computer, a laptop or a personal digital assistant (PDA), and is capable of carrying out data analysis based on the retrieved data to determine if there is any abnormality occurred during the transportation or storage of the object (not shown). In which case, the monitoring device 100' also includes an alarm 160 arranged to warn the user of the abnormality, such as when the condition exceeds or below a predetermined range.

In this embodiment, the monitoring device 100' includes a memory chip (not shown) arranged in the device for storing the sensed data. The memory chip (not shown) may be a volatile memory unit (such as RAM), a non-volatile unit (such as ROM, EPROM, EEPROM and flash memory), or both. The monitoring device 100' further comprises a display 140 to show the condition detected by each of the sensor 112, 114, 116 in the sensing module 110'. Preferably, the display 140 is a LED/OLED display, and the display 140 can be touch-sensitive for receiving input.

Figure 3:
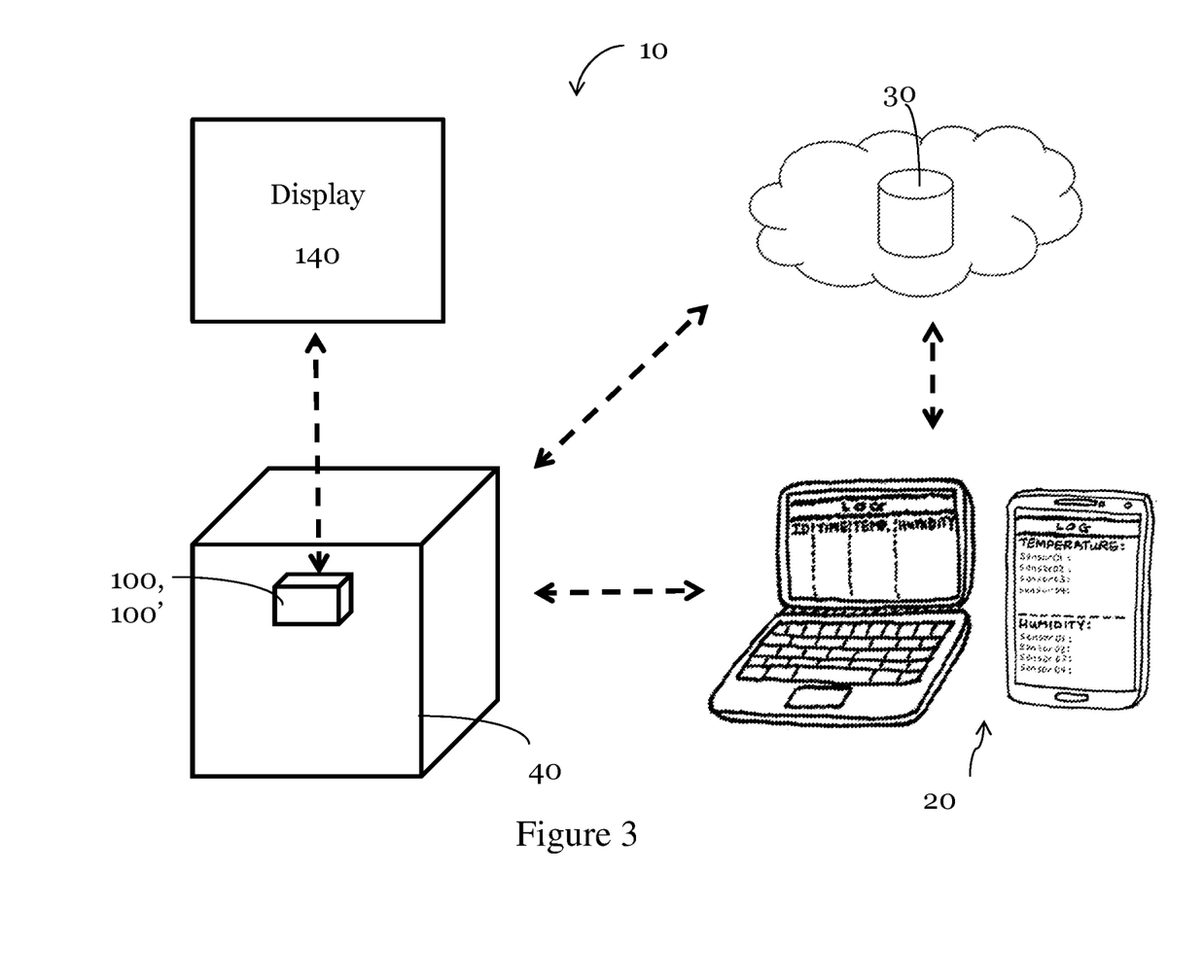
FIG. 3 shows a schematic diagram illustrating a monitoring system according to one embodiment of the invention.

FIG. 3 is a schematic drawing illustrating a monitoring system 10 with the monitoring device 100, 100' according to FIG. 1 or 2, for monitoring and tracking individual package's temperature and humidity in cold-chain logistic. In this exemplary embodiment, the monitoring device 100, 100' is operably connected to a display 140, an external electronic device 20, and a server 30. The monitoring device 100, 100' is placed inside a container 40 arranged to provide a cold environment. After the monitoring device 100, 100' is powered on, the monitoring device 100, 100' operates in either an active mode, a reduced operation mode or a hibernation mode based on the battery level of the power source. Each of the sensors senses a respective condition of the container 40 and display the conditions on the LED/OLED display screen 140 in real-time, such that the user can monitor the conditions of the container 40 without any time delay. The sensed data is then either transmitted directly to a server 30 for data storage or to an external electronic device 20 for remote monitoring and data analysis or both, in a wireless manner using for example Bluetooth, Wi-Fi and LTE network. The condition data, together with the time stamp and other associated data can be analysed using a pre-download app installed on the server 30 and/or the external electronic device 20. The external electronic device 20 or another other suitable external reader (not shown) may be used to read the unique identifier in the monitoring device 100, 100' to verify cases of anti-counterfeiting and allow keeping track of the statue and location of the container 40.

Figure 4:
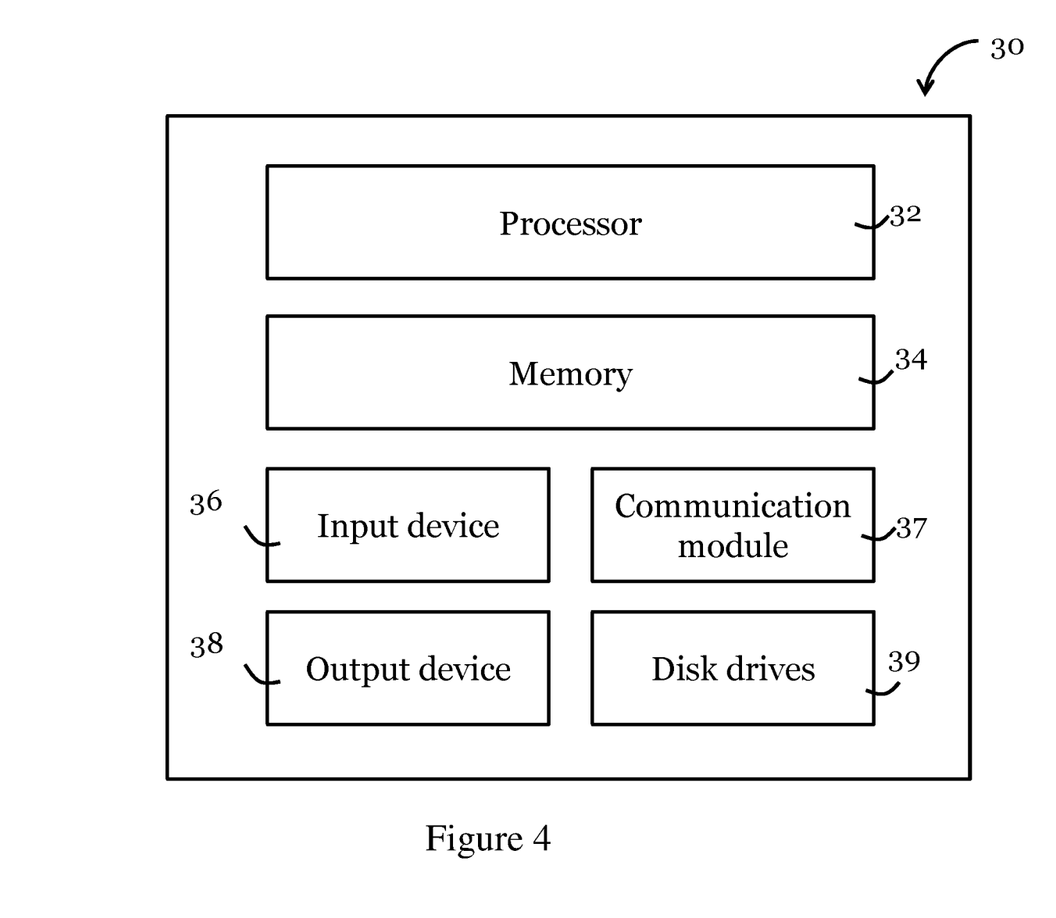
FIG. 4 shows an information handling system that can be configured as a server to operate in the monitoring system of FIG. 3.

The server 30 in this embodiment may have different configurations, and it generally comprises suitable components necessary to receive, store and execute appropriate computer instructions or codes. The main components of the server 30 are a processing unit 32 and a memory unit 34. The processing unit 32 is a processor such as a CPU, an MCU, etc. The memory unit 34 may include a volatile memory unit (such as RAM), a non-volatile unit (such as ROM, EPROM, EEPROM and flash memory) or both. Preferably, the server 30 further includes one or more input devices 36 such as a keyboard, a mouse, a stylus, a microphone, a tactile input device (e.g., touch sensitive screen) and a video input device (e.g., camera). The server 30 may further include one or more output devices 38 such as one or more displays, speakers, disk drives, and printers. The displays may be a liquid crystal display, a light emitting display or any other suitable display that may or may not be touch sensitive. The server 30 may further include one or more disk drives 39 which may encompass solid state drives, hard disk drives, optical drives and/or magnetic tape drives. A suitable operating system may be installed in the server 30, e.g., on the disk drive 39 or in the memory unit 34 of the server 30. The memory unit 34 and the disk drive 39 may be operated by the processing unit 32. The server 30 also preferably includes a communication module 37 for establishing one or more communication links (not shown) with one or more other computing devices such as a server, personal computers, terminals, wireless or handheld computing devices. The communication module 37 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 32, the memory unit 34, and optionally the input devices 36, the output devices 38, the communication module 37 and the disk drives 39 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 30 shown in FIG. 4 is merely exemplary, and that different servers 30 may have different configurations and still be applicable in the invention.

All the data collected from the monitoring device 100, 100' are stored in the device 100, 100', the server 30 or optionally the external electronic device 20. In one example, the external electronic device 20 is a smartphone. The smartphone, installed with a corresponding application, can retrieve all the collected and print out all the data from the monitoring device 100, 100', and synchronize the collected data with the server 30. The smartphone app can further aggregate and analyse the data for easier monitoring, by for example plotting a monitoring graph or chart based on the retrieved data to illustrate any trend and analyse the status to determine if any abnormality has occurred. Optionally, all the collected data can be shared through e.g. EDI, Webservice, Files and various methods, with the user's exiting systems such as SAP, Oracle, UF, Kingdee and other $3^{rd}$ party systems.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

Although not shown in the figures, but in other embodiments, the monitoring device may comprise other sensors in the sensing module, for example a pressure sensor and a light sensor. The wireless communication module does not necessarily have to include all three of the Bluetooth module, Wi-Fi module and cellular network module, but may only include one or two, or modules for other communication protocols such as Zigbee. In the above example, the power source is battery cells, but it may also include an energy harvesting module for harvesting energy from surrounding, e.g. solar energy. The monitoring device may further include a light indicator, a buzzer, and input means for selectively disabling one of the sensors or to manually select an operation mode. The monitoring system may comprise more than one monitoring device simultaneously connected to the display, the external electronic device and the server.

It will also be appreciated that where the system of the invention is either wholly implemented by computing system or partly implemented by computing systems then any appropriate computing system architecture may be utilized. This will include stand-alone computers, networked computers and dedicated hardware devices. Where the terms "computing system" and "computing device" are used, these terms are intended to cover any appropriate arrangement of computer hardware capable of implementing the function described.

Any reference to prior art contained herein is not to be taken as an admission that the information is common general knowledge, unless otherwise indicated.

The invention claimed is:

1. A monitoring device, comprising:
   a sensing module arranged to detect a condition of an object associated with the monitoring device;
   a wireless communication module operably connected with the sensing module, the wireless communication module being arranged to communicate the condition detected by the sensing module to an external electronic device; and
   an identification module with a unique identifier arranged to be read for identifying the monitoring device;
   wherein the monitoring device is arranged to operate in an active mode, a reduced operation mode, and a hibernation mode;
   wherein in the active mode, the sensing module continuously detects the condition of the object and the wireless communication module continuously transmits the detected condition to the external electronic device;
   wherein in the reduced operation mode, the sensing module continuously detects the condition of the object and the wireless communication module intermittently transmits the detected condition to the external electronic device; and
   wherein in the hibernation mode, the sensing module intermittently detects the condition of the object and the wireless communication module is deactivated.

2. The monitoring device of claim 1, wherein the sensing module includes a temperature sensor arranged to detect temperature of the object or of an environment in which the object is arranged.

3. The monitoring device of claim 1, wherein the sensing module further includes a humidity sensor arranged to detect humidity of the object or of an environment in which the object is arranged.

4. The monitoring device of claim 1, wherein the sensing module further includes a motion sensor arranged to detect a motion of the object.

5. The monitoring device of claim 4, wherein the motion sensor includes an accelerometer, an inertial measurement unit, or a gyro sensor.

6. The monitoring device of claim 1, wherein multiple sensors are arranged to simultaneously operate to detect respective conditions of the object.

7. The monitoring device of claim 1, wherein the wireless communication module comprises one or more of: a Bluetooth communication module, a Wi-Fi communication module, and a cellular communication module.

8. The monitoring device of claim 7, wherein the cellular communication module comprises an LTE communication module.

9. The monitoring device of claim 1, wherein the identification module comprises an NFC module, wherein the NFC module includes a RFID tag.

10. The monitoring device of claim 9, wherein the RFID tag is a dual-band RFID tag operable in a first frequency band and a second frequency band, and wherein the first frequency band is a high-frequency radio band for identification, and the second frequency band is a ultra-high-frequency radio band for locating the monitoring device.

11. The monitoring device of claim 1, further comprises a power source arranged to power the monitoring device, wherein the power source comprises at least one replaceable battery cell.

12. The monitoring device of claim 11, wherein the monitoring device is arranged to selectively operate in the active mode, the reduced operation mode, and the hibernation mode based on an energy level of the power source.

13. The monitoring device of claim 1, further comprises a display arranged to display the condition detected by the sensing module.

14. The monitoring device of claim 1, further comprises a clock arranged to determine a time stamp associated with the detected condition.

15. The monitoring device of claim 1, further comprises an alarm arranged to warn a user when the condition exceeds or below a predetermined range.

16. The monitoring device of claim 1, wherein the object is a container arranged to provide a cold environment, and wherein the monitoring device is arranged is suitable for attaching to the container.

17. A monitoring system, comprising:
    a monitoring device of claim 1; and
    an external electronic device arranged to communicate with the monitoring device for receiving one or more of: a condition detected by a sensing module and a unique identifier of the monitoring device.

18. The monitoring system of claim 17, wherein the external electronic device is further arranged to analyze the condition detected by the sensing module to provide an analysis result.

19. The monitoring system of claim 17, further comprises a display arranged to display the condition detected by the sensing module, and/or a server arranged to store the detected condition.

20. A monitoring device, comprising:
    a sensing module arranged to detect a condition of an object associated with the monitoring device;
    a wireless communication module operably connected with the sensing module, the wireless communication module being arranged to communicate the condition detected by the sensing module to an external electronic device; and
    an identification module with a unique identifier arranged to be read for identifying the monitoring device; the identification module comprising an NFC module, wherein the NFC module including a dual-band RFID tag operable in a first frequency band and a second frequency band, and wherein the first frequency band is a high-frequency radio band for identification, and the second frequency band is a ultra-high-frequency radio band for locating the monitoring device.

* * * * *